United States Patent

Galeano

[15] 3,670,968
[45] June 20, 1972

[54] SYSTEM AND PROCESS FOR RECOVERY OF CELLULOSIC FIBROUS MATERIAL FROM REFUSE

[72] Inventor: Sergio F. Galeano, Toledo, Ohio
[73] Assignee: Owens-Illinois, Inc.
[22] Filed: June 2, 1970
[21] Appl. No.: 42,686

[52] U.S. Cl.................................241/21, 241/24, 241/25, 241/101, 100/126
[51] Int. Cl.........................................................B02c 21/00
[58] Field of Search.....................241/5, 16, 20, 21, 24, 25, 241/28, 29, 30, 101; 100/DIG. 1, 126

[56] References Cited

UNITED STATES PATENTS

| | | | |
|---|---|---|---|
| 3,524,594 | 8/1970 | Anderson et al. | 241/25 X |
| 1,182,432 | 5/1916 | Stobie | 241/39 X |
| 2,587,997 | 3/1952 | Guettler | 100/126 X |
| 2,059,229 | 11/1936 | Gregg | 100/DIG. 1 |
| 2,331,455 | 10/1943 | Cowles | 241/21 |
| 3,154,255 | 10/1964 | Schulman et al. | 241/20 X |
| 3,426,673 | 2/1969 | Miner et al. | 100/126 X |

*Primary Examiner*—Granville Y. Custer, Jr.
*Attorney*—Alan J. Steger and E. J. Holler

[57] ABSTRACT

A system and process for recovering the cellulosic fibrous material contained in refuse, particularly municipal refuse, and converting it into pulp suitable for various paper product manufacturing purposes. The novel system of this invention features unique defiberation apparatus which, in combination with a magnetic separator and a vibrating screen, separates the cellulosic fiber from the remainder of the refuse. This system is well suited to be utilized in conjunction with a composting plant and/or a municipal sewage treatment plant to completely process all municipal refuse and/or sewage sludge while simultaneously removing the reuseable cellulosic fiber therefrom.

9 Claims, 5 Drawing Figures

SYSTEM AND PROCESS FOR RECOVERY OF CELLULOSIC FIBROUS MATERIAL FROM REFUSE

BACKGROUND OF THE INVENTION

This invention is related to my concurrently filed U.S. Ser. No. 42,783 entitled "Defiberation Apparatus for Separating Cellulosic Fibrous Material From Refuse" which is assigned to the same Assignee as the subject invention.

This invention relates to the recovery of cellulosic fibrous material from a municipal refuse.

More specifically, this invention relates to a unique system and process for recovering cellulosic fibrous material from a municipal refuse and converting it into pulp suitable for various paper product manufacturing purposes.

Cellulose fiber products are widely used and are disposed of in a variety of ways, all of which result in the fiber products having their final disposal site at the municipal refuse disposal location. An indication of the availability of waste paper is given by the following table on the composition of a typical municipal refuse in the United States:

| Plastics | 1% | Food Refuse | 12% |
|---|---|---|---|
| Sand, Dust | 8% | Glass | 6% |
| Ashes | 4% | Metal | 8% |
| Grass | 14% | Paper and Paperboard | 47% |

As can be seen from the preceding table, a large percentage of the composition of a typical municipal refuse is paper and paperboard products formed from cellulosic fibrous materials. Unfortunately, a very small percentage of this cellulosic fiber is actually being salvaged. The salvage of cellulosic fiber from refuse is presently confined to hand sorting along a belt conveyor in composting plants or to the salvage of waste paper, newsprint, etc., at different points along the disposal path of the original product. These methods are obviously very inefficient and expensive considering the small percentage of cellulosic fiber that is recovered.

The recovery of cellulosic fiber from municipal refuse is becoming more important as a substitution for the production of new cellulosic fiber directly from trees in our timberlands. As our population increases, the demand for and the usage of paper products will also increase thereby placing an unreasonable burden on our timberlands. Hence, there is an urgent need, both for the present and for the future, to provide a source of cellulosic fiber to supplement the direct usage of timberlands to produce such fiber.

Because of the increasing municipal refuse disposal problem, the system of this invention offers unique and different solutions which will reduce quantity and volume of the waste to be disposed of and ultimately their complete reduction.

SUMMARY OF THE INVENTION

It is, therefore, an object of this invention to provide a practical system and process for the recovery of cellulosic fibrous material from municipal refuse to supplement the ever-increasing demand for cellulosic fibers that is being placed on our timberlands.

This invention features a unique defiberation apparatus which, in combination with a magnetic separator and vibrating screen, separates the cellulosic fiber from the remainder of the refuse. The defiberating apparatus of this invention utilizes a plurality of liquid dispensing jets which impart a disintegrating and classifying action to the refuse and place the cellulosic fibers into a slurry of 1 to 2 percent consistency. This slurry is then suitable to be used directly in a paper making operation or to be pressed and baled to produce pulp for future paper making operations. The system of this invention is, therefore, well suited to be located adjacent to a paper mill to recover the cellulosic fiber from municipal refuse and process it for immediate use in the paper mill.

Additionally, the recovery system of this invention is well suited to be located in connection with a municipal sewage treatment plant and/or a composting plant.

Further, the present system will increase the life period of any municipal disposal area by reducing the quantity and volume of waste being disposed of therein.

Thus, the unique recovery system of this invention is adapted to recover a major portion of the cellulosic fiber in municipal refuse to thereby supplement the tremendous demand for cellulosic fiber that is currently being experienced.

Other objects, features and advantages of the subject invention will become obvious to those skilled in the art to which it pertains upon reference to the following detailed description and the drawings illustrating the preferred embodiments thereof.

IN THE DRAWINGS

DETAILED DESCRIPTION OF THE INVENTION

Figure 1:
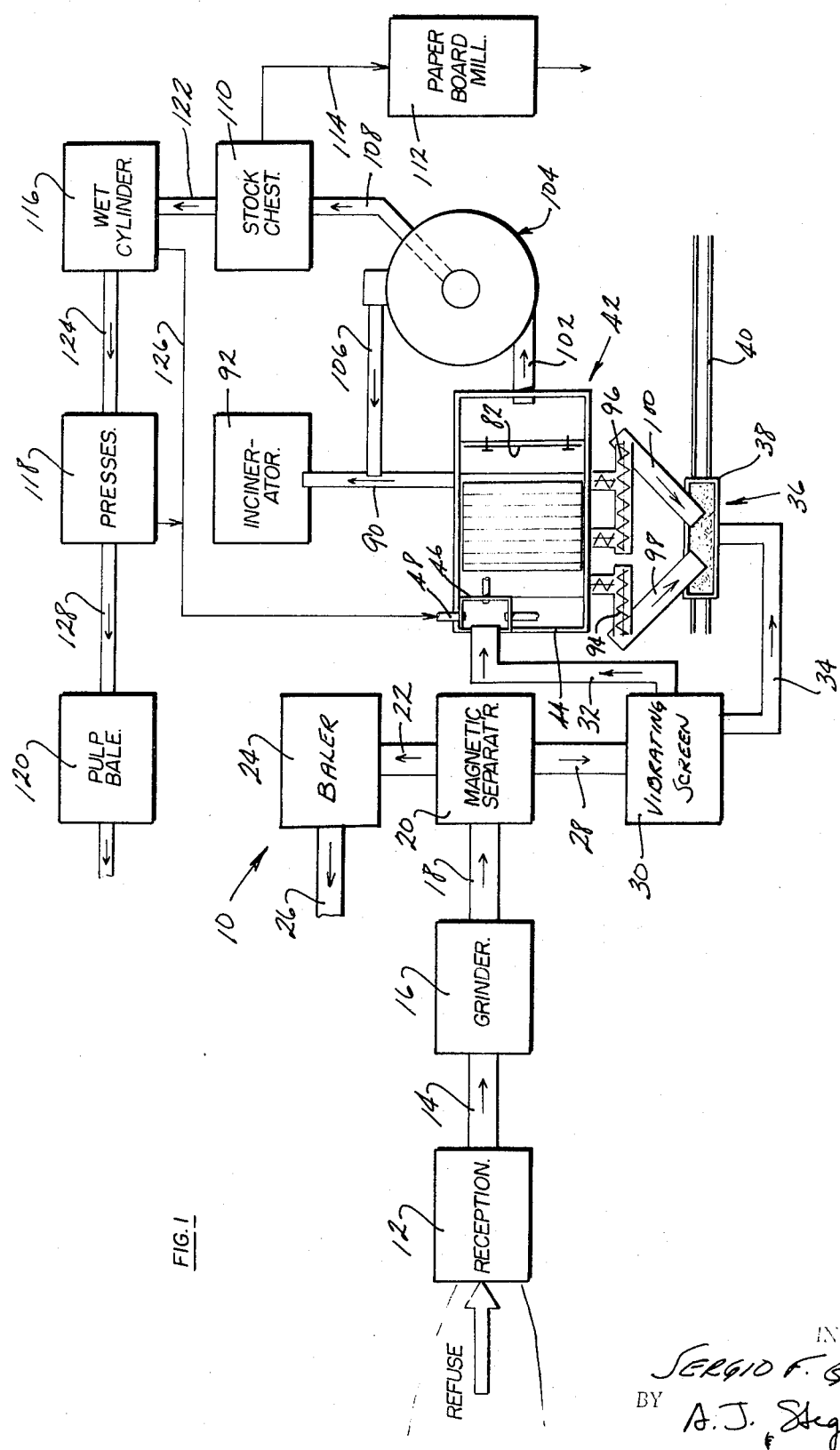
FIG. 1 is a schematic view of the apparatus which comprises the novel system of this invention.

In general, FIG. 1 shows a unique cellulosic fiber recovery system indicated generally by the numeral 10.

In FIG. 1, the numeral 12 indicates the area in which the reception of refuse from collection trucks at a municipal refuse disposal cite takes place. This cite could be a sanitary land fill, a dumping site, an incinerator plant, or a composting plant. The refuse which has been collected in the reception area 12 is transferred on a belt conveyor 14 to a grinder 16. The grinder 16 may be of any suitable type such as a chain mill, hammermill, or rasp-type grinder. In the grinder 16, the refuse is reduced to a size no larger than 2 to 3 inches in dimension. The ground refuse is then discharged from the grinder 16 onto a belt conveyor 18 and passed into a magnetic separator 20. In the magnetic separator 20, metal and other materials in the refuse which are subject to magnetic force are removed from the refuse and fed on belt conveyor 22 to a material baler 24. The metal removed by the magnetic separator is baled by the baler 24 and deposited on a belt conveyor 26 for delivery to a suitable metal receiving station (not shown). Meanwhile, the remainder of the refuse, which has not been eliminated by the magnetic separator 20, is passed from the magnetic separator 20 onto a belt conveyor 28 and fed to a vibrating screen 30. The vibrating screen 30 is of a suitable type having three vibrating trays with varying size openings therein. It is suggested, for example, that the vibrating screen 30 include a first tray having 1 inch openings therein and a second tray having ¾ inch openings therein which will catch the cellulosic fiber and deposit it on a belt conveyor 32. The remainder of the refuse which has fallen through the openings in the first and second trays will be received by a third tray and fed onto a belt conveyor 34, which transports it to a waste material receiving vehicle 36. The waste receiving vehicle 36 may be any suitable waste transporting device, such as a dumping truck or, as shown here, a railroad flat car 38 on railroad tracks 40.

The refuse, including cellulosic fiber which has been caught by the first and second trays within the vibrating screen 30 and deposited on conveyor belt 32, is delivered to a primary defiberator 42.

Figure 2:
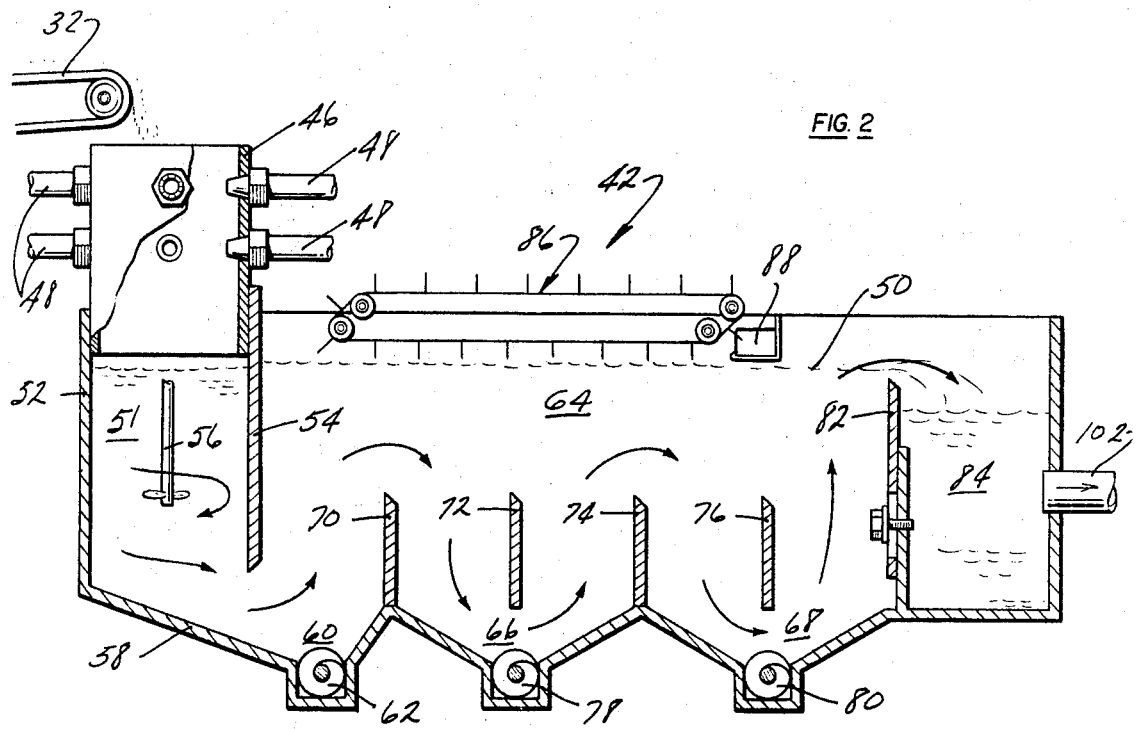
FIG. 2 is a sectional view of the unique defiberator apparatus of the recovery system of FIG. 1.
Figure 3:
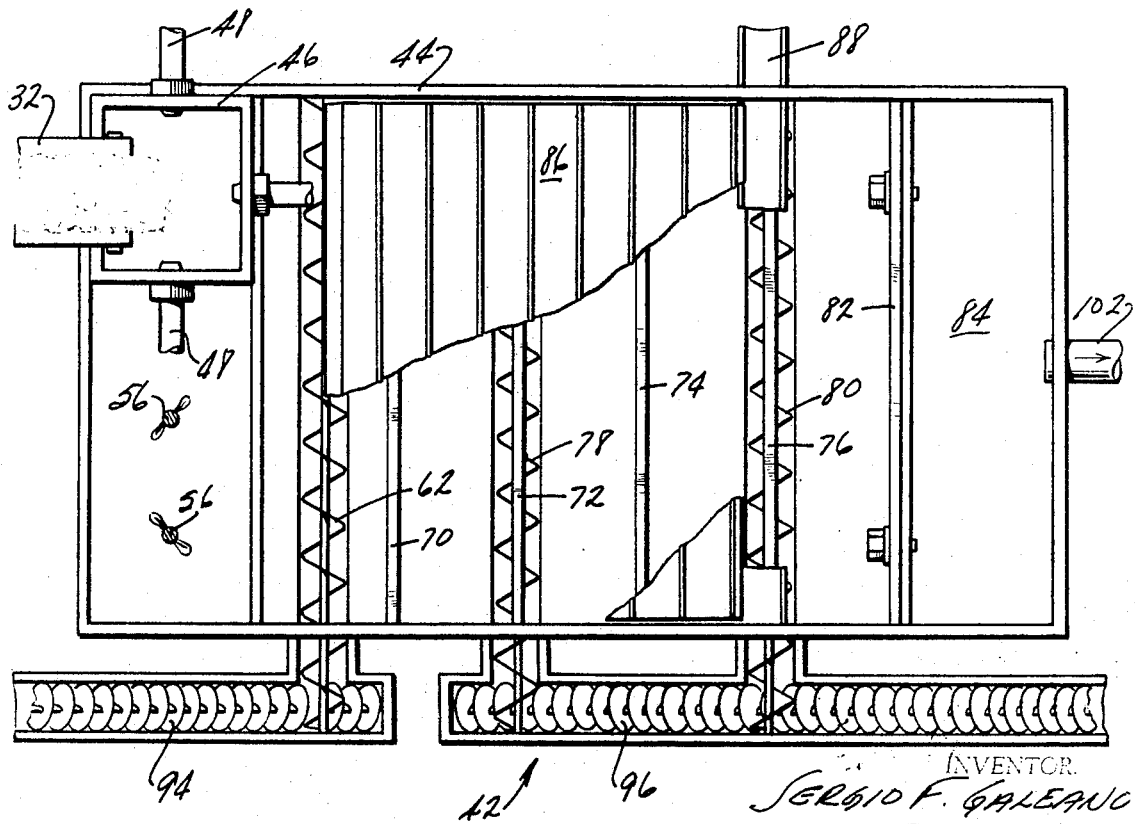
FIG. 3 is a top view with parts broken away of the defiberator apparatus of FIG. 2.

The details of the primary defiberator 42 can best be seen by reference to FIGS. 2 and 3. It should be noted that the refuse has been kept in a dried state up until the time that it reaches the primary defiberator 42. The primary defiberator 42 is seen to comprise a large tank 44 which includes a refuse receiving well 46. A plurality of water jet nozzles 48 are mounted in the side walls of the wells 46 to impinge liquid onto the refuse as it is dumped from conveyor belt 32 into the well 46. It should be noted that the nozzles 48 are located at varying points around the circumference of the well 46 and at different levels so as to form an aqueous curtain which contacts the incoming refuse. The jets of water emanating from the nozzles 48 serve to further disintegrate the refuse and precondition the cellulosic fiber material contained therein for the primary defiberating operation. Because of the constant addition of water through the nozzles 48 it can be seen in FIG. 2 that the water level in the primary defiberator 42 is maintained at a level indicated by the dash lines 50. The incoming refuse after being soaked with water from the nozzles 48 drops down into the inlet channel 51 formed between the end wall 52 of the tank 44 and in inlet barrier wall 54. A plurality of agitators 56 are mounted within the inlet channel 50 to further disintegrate and separate the incoming refuse. The bottom 58 of the inlet channel 51 is tapered so as to slant downwardly towards a first hopper 60. The heaviest particles in the refuse which is introduced into the inlet channel 51 will settle immediately towards the first hopper 60 from which they will be transported out of the primary defiberator 42 by means of a screw conveyor 62. The remainder of the slurry flows into the main chamber 64. The main chamber 64 has its lower portion divided into second and third hoppers 66 and 68 by means of divider walls 70, 72, 74 and 76. The second and third hoppers 66 and 68 each have a screw conveyor 78 and 80, respectively, to collect and carry away the undesirable noncellulosic solids. Thus, as the slurry flows through the hoppers 60, 66 and 68 by means of the path shown by the arrows in FIG. 2, the majority of undesirable non-cellulosic solids are removed from the slurry and transferred away from the primary defiberator 42. The cellulose material is kept in suspension in the slurry within chamber 64 by means of an adjustable weir 82. The resulting slurry spills over the adjustable weir 82 into an effluent channel 84. At the top of the main chamber 64 a floating layer of scum (e.g. leaves, grass, etc.) will be formed. A skimmer 86 is provided to gently collect this scum and deposit it into a sump 88 From the sump 88 the scum will be transported by means of a conveyor 90 to an incinerator 92.

The non-cellulose solids collected in and removed by the screw conveyors 62, 78 and 80 are fed to a pair of collecting conveyors 94 and 96 which in turn feed belt conveyors 98 and 100. The belt conveyors 98 and 100 transport the undesirable noncellulose solid material to the railroad flat car 38 for removal from the processing site. The collection conveyors 94 and 96 are inclined so as to impart a dewatering action to the refuse being removed by emerging above the level of the slurry in the main tank 64 prior to depositing the refuse on the belt conveyors 98 and 100.

The resulting slurry, which has reached the effluent channel 84, is removed from the channel 84 through pipes 102 which lead to a secondary defiberator 104. The secondary defiberator 104 in the system of this invention may be any suitable machine, several of which are available commercially. Such a device is available from the Black-Clawson Company, Middletown, Ohio 45042, under the trade name "Hydropulper" or from the Beloit Corporation, Beloit, Wis. 53511, under the trade name "Barracuda." The type of machine that is used as the secondary defiberator 104 in this installation imparts a vortex action to the slurry and is used commercially at present to separate fibers from waste paper. In the vortex action of the secondary defiberator 104 the undesirable solid particles in the slurry (plastics, etc.) rise to the top of the secondary defiberator and are removed from the defiberator 104 and deposited on a conveyor 106, which transfers these undesirable particles to the conveyor 90 on which they join the refuse removed by the skimmer 86 and are fed to the incinerator 92.

The remaining slurry, now containing only cellulose fibers, exits from the secondary defiberator 104 through a pipe 108 which carries the slurry to a stock chest 110. The disposition of the processed slurry being deposited in stock chest 110 will depend on whether the recovery system 10 of this invention is located adjacent to a paper mill or whether the resulting recovered slurry is to be processed and the fibers baled for shipment to a paper mill. For example, if the recovery system 10 is located adjacent to a paper mill (shown schematically as 112) the slurry contained in stock chest 110 will be fed, by means of the path indicated by arrow 114, to the paper mill 112. If baling of the resulting pulp rather than a finished product is desired, the conventional baling equipment such as a wet cylinder 116, presses 118, and baler 120 must be provided. The pulp slurry in the stock chest 110 would then be fed to the wet cylinder 116 through a pipe 122 wherein it would be passed through a series of mesh screens to separate the cellulosic fibers from the water. The separated fibers are then passed on conveyor 124 to a series of presses 118 which compress the recovered fibers to remove water remaining therein. It should be noted that the water removed from the fibers in the wet cylinder 116 and the presses 118 may be cycled by means of path 126 back to the primary defiberator 42 and added to new refuse being processed through water jet nozzles 48. The resulting pressed fibers are removed from the presses 118 on conveyor 128 to the pulp baler 120 where they are baled for shipment to a paper mill.

Therefore, the unique cellulosic fiber recovery system 10 as shown in FIG. 1 is well suited to completely process a standard municipal refuse to recover therefrom a large percentage of the reuseable cellulosic fiber contained therein. It is further adapted to process this recovered cellulosic fiber for either direct delivery to an adjacent paper mill or for processing to bale the recovered pulp for shipping to a paper mill. In the process of recovering this reuseable cellulosic fiber the unique system of this invention also separates and bales all magnetically responsive materials (e.g. metals), and further separates for dumping all other solid materials containing therein. In addition, this system eliminates and incinerates all other undesirable noncellulosic materials from the refuse being processed.

From the preceding explanation, it should be apparent that this invention consists of different unit operations adapted specifically to the characteristics of the material handled. This system affords the advantage of implementation into any municipal disposal cite since the first stage is the reception of the refuse. The integration of the subject invention into any of the standard refuse disposal methods is not complicated and will, in fact, result in a reduction in costs and in improvement in the operation.

The subject invention permits further classification of the rejected refuse coming out from the vibrating screen 30 and from the primary defiberator 42 if so desired. For example, it may be desirable to further separate glass from this refuse by means of a centrifugal device.

Figure 4:
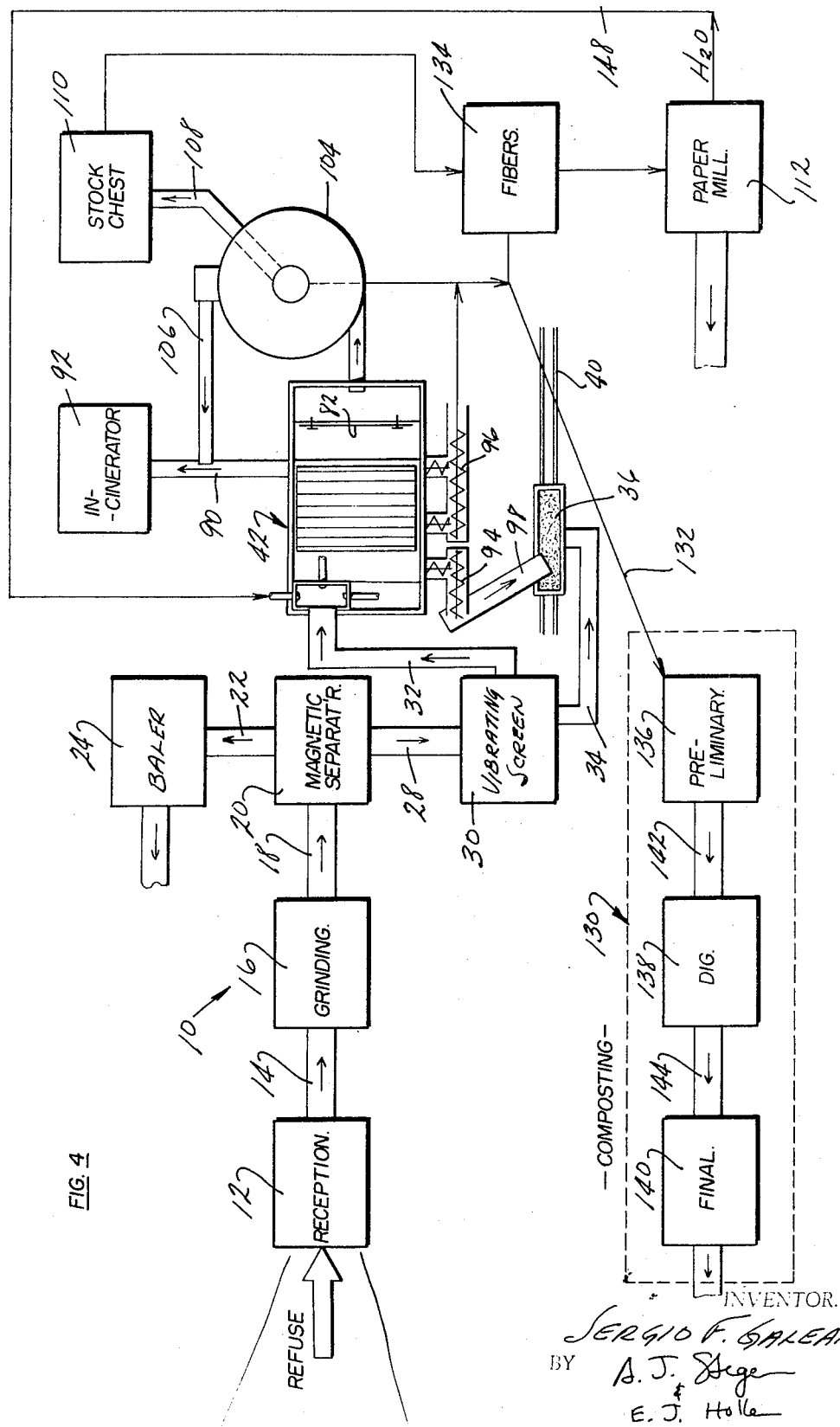
FIG. 4 is a schematic view of the recovery system of this invention as utilized in connection with a composting plant.

FIG. 4 illustrates how the recovery system 10 of the subject invention (as shown in FIGS. 1 through 3) may be adapted to be utilized in conjunction with a composting plant. The main operations of the recovery system 10 are identical with their counterparts in FIG. 1 and are labeled with the same reference numerals. The main difference being that the noncellulosic solid materials that are removed from the primary defiberator 42 on collection conveyor 96 may be transported directly to a composting plant 130. Similarly, the heavy particles rejected from the secondary defiberator 104 may also be fed by way of path 132 to the composting plant 130. Also, the cellulosic fibers which are recovered from the refuse by the system 10 may be classified at a fiber classification station 134 prior to being passed to the paper mill 112. This classification stage 134 consists of a series of stages by which remaining plastics are removed in one stage and fibers are classified according to length in another stage. The first stage of separation may be accomplished by a machine sold by the Bauer Bros. Co., Springfield, Oh. 44501, under the trade name "Centricleaner" or a similar device sold by the Bird Machine Co. of Walpole, Mass. 02071, under the trade name "Centrascreen." The second stage of separation may be accomplished by a machine sold by the Bauer Bros. Co. of Springfield, Oh. 44501, under the trade name "Hydrosieve." Thus, the fibers which are rejected at the classification station 134 may also be fed to the composting plant 130 by means of path 132. The composting plant 130 may be of any suitable commercial type comprising three unit operations including a preliminary or receiving operation 136, a digesting operation 138, and a final operation 140. These three operations are connected by means of conveyors 142 and 144. Thus, rather than dumping some of the refuse separated by the primary defiberator and incinerating some of the refuse material separated by the secondary defiberator, this material along with unsuitable fibers, which have been separated at a classification station, may be immediately transported to an adjacent composting plant. Hence, it can be seen that the unique recovery system 10 of this invention may be located so as to be used in combination with a municipal refuse dump and a composting plant, while performing its primary function of recovery of cellulosic fibers for reuse in a paper mill.

Figure 5:
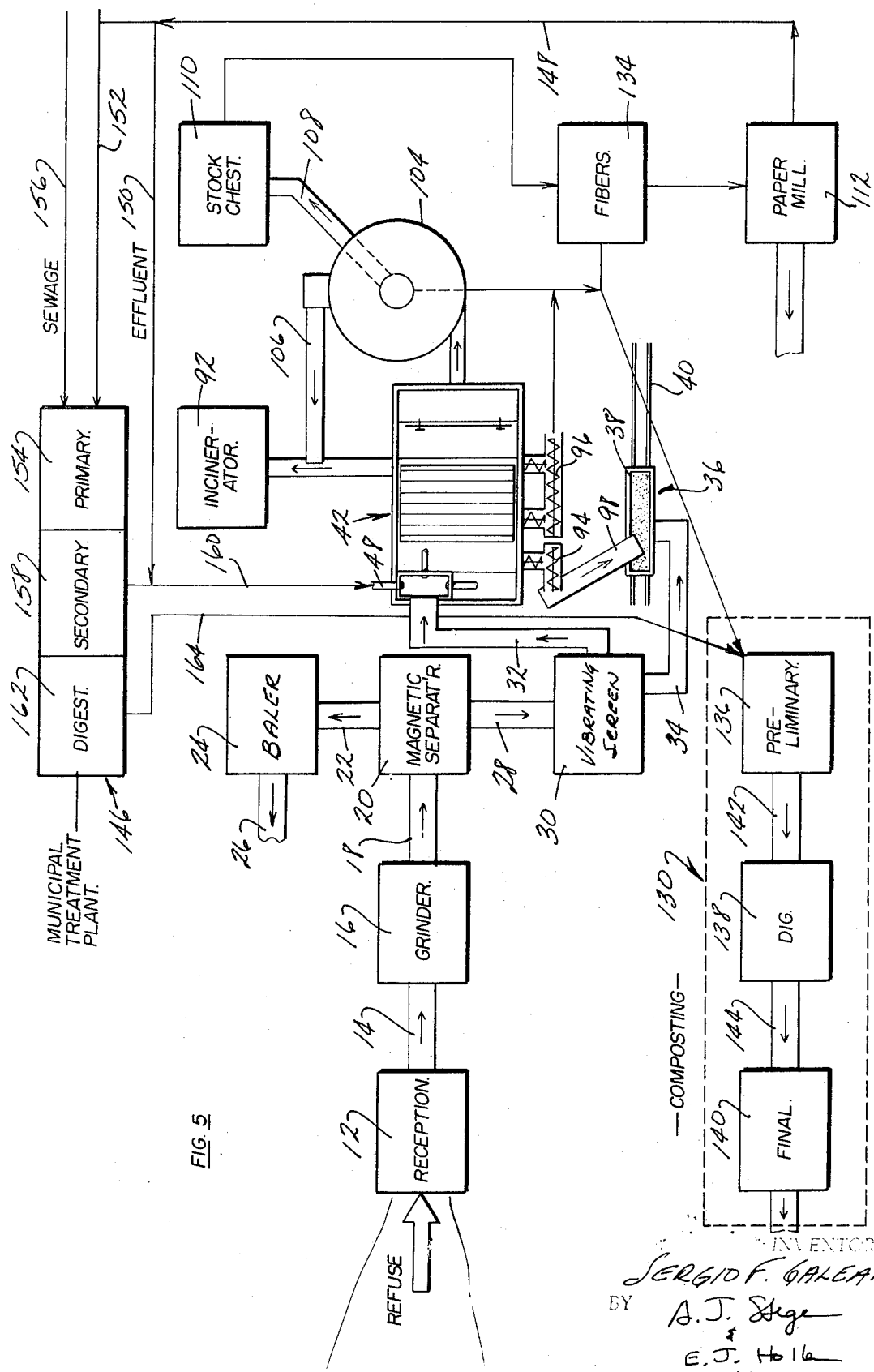
FIG. 5 is a schematic view of the recovery system of this invention as utilized in combination with a composting plant and municipal sewage treatment plant.

FIG. 5 illustrates how the unique recovery system 10 of this invention may also be utilized in conjunction with a municipal sewage treatment plant 146. As was the case in FIG. 4, the primary units of the recovery system 10 are the same as they were in FIG. 1 and are identified by the identical numerals as FIG. 1. As can be seen in FIG. 5, the effluent from a paper mill 112 is cycled by means of a path 148 and divided so that part of it follows path 150 back into the primary defiberator 42 and the remainder follows path 152 into the primary stage 154 of the municipal sewage treatment plant along with the sewage which enters by means of path 156. In the secondary station 158 of the municipal treatment plant 146 some of the water is removed from the sewage treatment process and joins the paper mill effluent from path 150 to be transported together along path 160 to the water jet nozzles 48 in the primary defiberator 42. Therefore, it can be seen that the liquid which is removed and utilized in the paper mill is then cycled to serve both as a liquid medium in the sewage treatment plant 146 and as the liquid additive for the treatment of municipal refuse in the primary defiberator 42. From the secondary stage 158 of the municipal treatment plant 146 the sewage is passed into a digesting stage 162 which treats the municipal sewage sludge and directs it along path 164 to the composting plant 130. Thus, as shown in FIG. 5, both municipal refuse and municipal sewage are completely treated so as to result in the by-product of a composting plant and the unique recovery of cellulosic fiber from the refuse which can be reprocessed in an adjacent paper mill to be returned to useful existence as paper. The only other by-products of this system are the magnetically attracted materials, which are separated and baled for removal on conveyor 26, and the large solid particles removed by the primary defiberator 42 for removal by the railroad car 38.

Thus, from the preceding, it can be seen that the unique recovery system and process of this invention is capable of completely treating municipal refuse and recovering the reuseable cellulosic fibers therefrom for reintroduction into a paper mill. Additionally, the unique recovery system of this invention is well suited to be used in combination with a composting plant and a municipal sewage treatment plant to completely process all municipal refuse and sewage sludge while simultaneously removing the reuseable cellulosic fiber therefrom. Furthermore, the system of this invention by reducing the volume of refuse at a municipal refuse area will permit such municipal refuse area to have a considerably longer life period.

I claim:

1. A system for recovering the cellulosic fibrous material contained in refuse and converting it into pulp suitable for reprocessing into useful paper products comprising, in combination:
    grinding means positioned to receive said refuse and adapted to reduce the size of the objects in said refuse;
    magnetic material separating means positioned to receive said refuse from said grinding means and adapted to remove magnetically responsible material from said refuse;
    vibrating means positioned to receive the remainder of the refuse not removed by said magnetic material separating means and adapted to separate and remove from said refuse a large portion of the noncellulosic material contained therein;
    primary defibrator means positioned to receive the remainder of said refuse from said vibrating screen means and adapted to impinge liquid on said refuse for placing the cellulosic fibrous material contained therein in a pulp-like slurry and separating the majority of any remaining non-cellulosic material from said slurry; and
    secondary defibrator means positioned to receive said pulp-like slurry from said primary defibrator means for removing the remaining noncellulosic material and thereby rendering said pulp-like slurry suitable for reprocessing into useful paper products.

2. A system as set forth in claim 1 further including a stock chest positioned to receive said cellulosic fiber-containing slurry from said secondary defiberator means for storage for reprocessing into useful paper products.

3. A system as set forth in claim 2 further including pulp pressing and baling means positioned to receive said cellulosic fiber-containing slurry from said stock chest and adapted to remove the liquid from said slurry and press and bale the resulting cellulosic fibers to a form suitable for handling.

4. A system as set forth in claim 1 further including a baling means positioned to receive the magnetic material separated by said magnetic material separating means and adapted to compress and bale such magnetic material into a form suitable for handling.

5. The method of recovering cellulosic fibrous material contained in refuse and converting it into pulp suitable for reprocessing into useful paper products comprising the steps of:
    grinding the refuse to reduce the size of the material contained therein;
    magnetically separating the magnetically responsive material from said refuse;
    passing said refuse over a vibrating screen to remove a large portion of the noncellulosic material contained therein;
    impinging liquid on said refuse in a large tank to thereby place the cellulosic fibrous material therein in a pulp-like slurry;
    removing any noncellulosic material which settles to the bottom of said tank or rises to the surface of said tank;
    and draining said cellulosic fiber-containing slurry from said tank for reprocessing into useful paper products.

6. The method as set forth in claim 5 further including the steps of conducting said cellulosic fiber-containing slurry drained from said tank to a secondary defibrator means to remove any remaining noncellulosic material and conducting said cellulosic fiber containing slurry from said secondary defibrator means directly to a paperboard mill for reprocessing into useful paper products.

7. The method as set forth in claim 5 further including the steps of:
    pressing said cellulosic fiber-containing slurry drained from said tank to remove the liquid therefrom; and
    baling said pressed cellulosic fibers into a form suitable for handling.

8. The method as set forth in claim 5 further including the step of baling the magnetic material separated from said refuse into a form suitable for handling.

9. In combination with a paper mill, a system for recovering the cellulosic fibrous material contained in refuse and converting it into pulp suitable for reprocessing into useful paper products comprising:
    grinding means positioned to receive said refuse and adapted to reduce the size of the objects in said refuse;
    magnetic material separating means positioned to receive said refuse from said grinding means and adapted to remove magnetically responsive material from said refuse;

vibrating screen means positioned to receive the remainder of the refuse not removed by said magnetic material separating means and adapted to separate and remove from said refuse a large portion of the noncellulosic material contained therein;

defiberator means positioned to receive the remainder of said refuse from said vibrating screen means and adapted to impinge liquid on said refuse to thereby place the cellulosic fibrous material contained therein in a pulp-like slurry; and conducting means connecting to said defiberator means and said paper mill and adapted to conduct said cellulosic fiber-containing slurry from said defiberator means to said paper mill for reprocessing into useful paper products.

* * * * *